United States Patent
Matylitski

(10) Patent No.: US 10,362,110 B1
(45) Date of Patent: Jul. 23, 2019

(54) DEPLOYMENT OF CLIENT DATA COMPUTE KERNELS IN CLOUD

(71) Applicant: Amazon Technologies, Inc., Seattle, WA (US)

(72) Inventor: Ivan Matylitski, Dublan (IE)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 15/373,367

(22) Filed: Dec. 8, 2016

(51) Int. Cl.
*G06F 15/16* (2006.01)
*H04L 29/08* (2006.01)

(52) U.S. Cl.
CPC .......... *H04L 67/1097* (2013.01); *H04L 67/32* (2013.01)

(58) Field of Classification Search
CPC ..... H04L 63/16; H04L 67/1097; H04L 67/06; H04L 67/34; H04L 67/02; H04L 67/2842; H04L 67/32; G06F 21/53
See application file for complete search history.

(56) References Cited

U.S. PATENT DOCUMENTS

| | | | | |
|---|---|---|---|---|
| 5,987,506 | A * | 11/1999 | Carter | G06F 9/5016 707/999.01 |
| 6,920,631 | B2 | 7/2005 | Delo | |
| 9,049,265 | B1 * | 6/2015 | Greenfield | H04L 67/1097 |
| 9,462,056 | B1 * | 10/2016 | Protopopov | H04L 67/2838 |
| 2003/0046589 | A1 * | 3/2003 | Gregg | G06F 21/335 726/5 |
| 2004/0064552 | A1 * | 4/2004 | Chong | G06F 11/3006 709/224 |
| 2006/0294413 | A1 * | 12/2006 | Filz | G06F 8/65 714/4.4 |
| 2007/0245409 | A1 * | 10/2007 | Harris | H04L 63/0272 726/5 |
| 2008/0148300 | A1 * | 6/2008 | Archer | G06F 9/5055 719/330 |
| 2008/0320071 | A1 * | 12/2008 | Hoskins | G06F 11/3688 709/202 |
| 2009/0037424 | A1 * | 2/2009 | Susairaj | H04L 67/1097 |
| 2010/0023582 | A1 * | 1/2010 | Pedersen | H04L 63/0272 709/203 |
| 2011/0004878 | A1 * | 1/2011 | Divoux | G06F 9/4856 718/1 |
| 2011/0022812 | A1 * | 1/2011 | van der Linden | G06F 9/5077 711/163 |

(Continued)

*Primary Examiner* — Phyllis A Book
(74) *Attorney, Agent, or Firm* — Robert C. Kowert; Meyertons, Hood, Kivlin, Kowert & Goetzel, P.C.

(57) ABSTRACT

A data storage service includes a client data compute kernel manager that receives and registers a client data compute kernel in a client kernel repository. The client data compute kernel may be a custom data compute kernel that is received from a client. The data storage service includes a client request handler that receives data access requests to a client data store. The client request handler may determine that a data access request is associated with the client data compute kernel. The client request handler may then deploy the client data compute kernel to one or more selected storage servers, and then forward the data access request to the client data compute kernel. A storage server may execute a storage service engine of the data storage service in one execution container on the storage server and the client data compute kernel on a second execution container on the storage server.

20 Claims, 10 Drawing Sheets

(56) References Cited

U.S. PATENT DOCUMENTS

| | | | |
|---|---|---|---|
| 2012/0059876 A1* | 3/2012 | Chinta | G06F 21/53 709/203 |
| 2012/0173541 A1* | 7/2012 | Venkataramani | G06F 12/0844 707/747 |
| 2013/0227563 A1* | 8/2013 | McGrath | G06F 9/45533 718/1 |
| 2013/0268757 A1* | 10/2013 | Kulkarni | G06F 21/33 713/168 |
| 2014/0052864 A1* | 2/2014 | Van Der Linden | G06F 9/5077 709/226 |
| 2014/0059226 A1* | 2/2014 | Messerli | G06F 9/5072 709/226 |
| 2014/0280433 A1* | 9/2014 | Messerli | H04L 67/06 709/201 |
| 2014/0280961 A1 | 9/2014 | Martinez et al. | |
| 2014/0344891 A1* | 11/2014 | Mullick | H04L 63/0272 726/1 |
| 2016/0292171 A1* | 10/2016 | Bhagat | G06F 17/30094 |
| 2016/0301742 A1* | 10/2016 | Lowery | H04L 67/10 |
| 2017/0091192 A1* | 3/2017 | Kuralenok | G06F 17/30283 |
| 2017/0300693 A1* | 10/2017 | Zhang | G06F 21/566 |
| 2018/0157690 A1* | 6/2018 | Kabiljo | G06F 17/30321 |

\* cited by examiner

DEPLOYMENT OF CLIENT DATA COMPUTE KERNELS IN CLOUD

BACKGROUND

In recent years, data storage systems have been migrating into the cloud. For example, large service provider networks such as Amazon Web Services™ offer a variety of cloud-based storage services such as object storage services, block-based storage services, file systems, and relational database services. The service provider may provide access to these storage services via public access interfaces or protocols. The data storage service may be hosted by the service provider's network, which includes large numbers of interconnected computing systems. The computing system may comprise a cluster of storage service nodes that are responsible for executing software operating as the storage service engine for the data storage service. The storage service nodes may be physical machines or instances of virtual machines operating on virtualization hosts. Typically, the storage service nodes and the storage service engine, which may include a query planner, translator, and compiler, are statically integrated to the data storage service. Clients of the data storage service are not generally permitted to interact directly with or customize the storage service engine or the underlying storage backend.

Client applications may perform data analysis on data stored in a cloud-based data storage service. A client application may access the data storage service in one of several of ways. For example, the client application may use a query language such as structured query language (SQL) to obtain data from the service. As another example, the client application may access the data in using an application programming interface (API) provided by the storage service. However, these types of interfaces present a number of drawbacks. First, users of the data storage service must learn to use these service interfaces. Second, the service interface may not allow the client application to take advantage of all capabilities of the underlying storage service engine. This latter problem forces the client application to copy large datasets over the network to perform more sophisticated analysis on the client site. Moreover, the algorithms implemented by the storage service engine, for example the query planner, translator, compiler, etc., represent an overgeneralization in terms of how data access requests should be handled. On the other hand, client applications have particular knowledge of the particular type of data access requests that will be issued and the type of data the requests will be accessing, and thus may be able to take advantage of special optimizations in terms of how the requests are processed. However, client applications are not always able to dictate such optimizations through the service interface. Third, in a pure client-server model, the client must maintain sufficient physical resources on the client site to perform the client-specific data analysis tasks. These and other problems prevent the client application from taking full advantage of the cloud computing environment, and generally result in client systems that are inflexible in design and inefficient for many types of data tasks.

Figure 1:
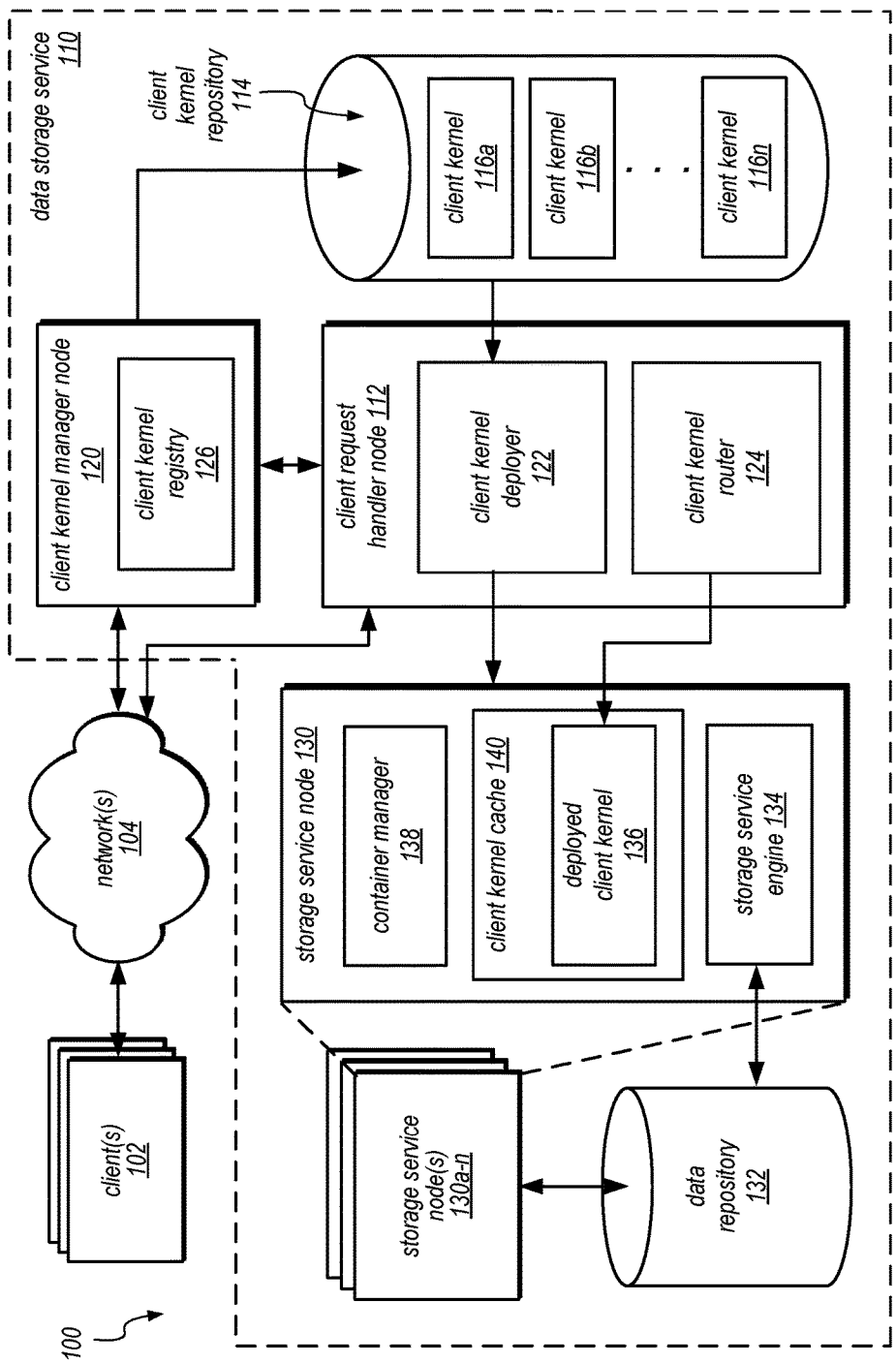
FIG. 1 is a block diagram illustrating an example computer system that deploys client data compute kernels, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of data storage systems are disclosed herein that can receive, deploy, and execute client data compute kernels in a service provider network. A data storage system may be implemented in as a cloud-based data storage service in the cloud, such as an object storage service, a block-based storage service, a file system, or a relational database service, etc. The service provider may provide access to the storage service via public access interfaces or protocols. The data storage service may be deployed in the service provider's network, which operate large numbers of interconnected computing systems. A computing system may comprise a cluster of storage service nodes that are responsible for executing the storage service engine for the data storage service. In some cases, the storage service nodes may be physical machines. In other cases, the storage service nodes may be instances of virtual machines operating on virtualization hosts.

In embodiments disclosed herein, a data storage service may allow client-provided data access systems to be deployed in the service provider network and executed in an execution environment hosted by the service provider network. The client-provided systems may be a custom client data compute kernel that alters some of the functionality implemented by the storage service engine, while retaining the ability to use the basic functionality implemented by the storage service engine. For example, the client data compute kernel may be programmed to implement a custom query planner, translator, compiler, etc. In some cases, the client data compute kernel may implement a custom query language or data access API. The client data compute kernel may also be programmed to perform certain data manipulation or computation tasks inside the service provider network. The client data compute kernel will execute in the service provider network and thus eliminates the wire gap (e.g., the network) that must be traversed during the conventional data computation or manipulation process. By placing the client data compute kernels closer to the actual data, the computation process is made more secure and more efficient. The client data compute kernel may be deployed in a just-in-time fashion in response to received client requests, or cached on certain nodes of the data storage service for specified periods of time. The client data compute kernel may be executed in a container that isolates the client system from the data storage service and other client systems. The client data compute kernel may continue to execute in a session, which may be controlled by the data storage service or the client. These and other features of the inventive systems and methods are discussed in further detail below in connection with the figures.

FIG. 1 is a block diagram illustrating an example computer system that deploys client data compute kernels, according to some embodiments. System 100 may include a data storage service 110 that is accessible to one or more clients 102 over a network 104. The data storage service 110 may be any type of service that allows remote clients to store and access data maintained in a service provider network. A data storage service 110 may be, for example, an object storage service, a block-based storage service, a file system, or a relational database service, etc.

The data storage service 110 may be hosted in one or more data centers operating various resource pools, such as collections of physical and/or virtualized computer servers, storage devices, networking equipment and the like, needed to implement and distribute the infrastructure for the data storage service 110. In some embodiments, computing resources in the data storage service 110 may be implemented in units of virtual compute instances.

Virtual compute instances are one example of virtual computing resources. The virtual computing resources may be hosted on a virtualization host. A virtualization host may be one or more physical computing devices. The physical computing devices are an example of physical computing resources. A virtualization host may include a virtualization management module capable of instantiating and managing a number of different client-accessible virtual computing resources. The virtualization management module may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

An instance in the data storage service 110 may comprise one or more servers with a specified computational capacity (which may be specified by indicating the type and number of CPUs, the main memory size, and so on) and a specified software stack (e.g., a particular version of an operating system, which may in turn run on top of a hypervisor). One or more different computing devices may be used singly or in combination to implement the instances on the virtualization host. The computing devices may include general purpose or special purpose computers, storage devices, network devices and the like. The instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications. Different types of instances may be implemented in the production environment 106. Different instances may have different numbers of virtual CPU cores, and different amounts of memory, cache, storage and/or networking capacity, as well as any other performance characteristic. Configurations of instances may include their location, in a particular data center, availability zone, geographic, location, etc., and (in the case of reserved compute instances) reservation term length.

The clients 102 may encompass any type of client configurable to submit data access requests to the data storage service 110. For example, a given client 102 may include a suitable version of a web browser, or may include a plug-in module or other type of code module configured to execute as an extension to or within an execution environment provided by a web browser. Alternatively, a client 102 may encompass an application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 102 may be configured to generate network-based services requests according to a Representational State Transfer (REST)-style network-based services architecture, a document- or message-based network-based services architecture, or another suitable network-based services architecture. In some embodiments, a client 102 may be configured to provide access to the data storage service 110 in a manner that is transparent to applications implemented on the client 102 utilizing computational resources provided by the data storage service 110.

The clients 102 may convey network-based data access requests to the data storage service 110 via network 104. In various embodiments, network 104 may encompass any suitable combination of networking hardware and protocols necessary to establish network-based communications between clients 102 and data storage service 110. For example, a network 104 may generally encompass the various telecommunications networks and service providers that collectively implement the Internet. A network 104 may also include private networks such as local area networks (LANs) or wide area networks (WANs) as well as public or private wireless networks. For example, both a client 102 and the data storage service 110 may be respectively provisioned within enterprises having their own internal networks. In such embodiments, the network 104 may include the hardware (e.g., modems, routers, switches, load balancers, proxy servers, etc.) and software (e.g., protocol stacks, accounting software, firewall/security software, etc.) necessary to establish a networking link between the client 102 and the Internet as well as between the Internet and data storage service 110. In some embodiments, clients 102 may communicate with data storage service 110 using a private network rather than the public Internet.

The data storage service 110 may operate on computing resources in a service provider network, and may be controlled and configured by clients 120 via various interfaces such as graphical user interface (GUI) (e.g., as part of an administration control panel or web site) and/or as a programmatic interface such as an Application Programming Interface (API). The data storage service 110 may expose different types of storage access interfaces, including access interfaces for block-based storage services, key-value storage service, relational database services, NoSQL database services, file system services, and the like.

The data storage service 110 may be implemented using a single server or a cluster of compute nodes. The compute nodes may be physical servers or virtual computing resources hosted on one or more virtualization hosts. In the case of a clustered implementation, the data storage service 100 may include a client request handler node 112 and a storage service node 130. In some embodiments, the client request handler node 112 and the storage service node 130 may be the same node. In some embodiments, the client request handler node 112 may operate as an outer layer of nodes that intermediates between the clients 102 and the core storage service nodes 130. The client request handler node 112 may perform a load balancing function to distribute client data access requests from the clients 102 among the storage service nodes 130. For example, in some embodiments, information about the storage service nodes 130 may be used by the client request handler nodes 112 to weight a random selection of storage service nodes 130. As an example, the client request handler node 112 may understand that a particular client data store may only be associated with a particular group of storage service nodes 130. The client request handler node 112 may examine an incoming data access request to determine which client data store is being accessed, and then forward the request to a storage service node 130 in the appropriate group. As another example, if the client request handler node 112 know that different storage service nodes 130 are different types of devices or are configured with different CPUs and thus have different capabilities or capacities, the information may be used to bias the random selection towards (or away from) particular type(s) or configuration(s) of storage service nodes 130.

As shown in FIG. 1, a client manager node 120 may interfaces with clients 102 to receive uploaded client data compute kernels 116. The client kernel manager node 120 may implement functionality associated with management of client data compute kernels 116a-n maintained in the data storage service 110. The client data compute kernels 116 may comprise one or more executable modules that perform customized data access with respect to the data stored in a client data store. The client data compute kernels may be programmed by a client 102 and provide a custom interface to remote applications of the client 102. The client data compute kernels 116 may also read or write client data in the data storage service 110. The client data compute kernels may also perform certain data analysis or computations with the data in the data storage service, before the data is returned to the client 102 or updated in the data storage service 110. In this manner, certain data intensive computations may be performed inside the data storage service 110. This may allow the computations to be performed more efficiently, using the hardware and software facilities of the data storage service 110.

The client kernel manager node 120 may provide an interface, such as a GUI or API, to clients 102 to allow the clients 102 to manage the client data compute kernels 116. The management interface may allow the clients 102 to upload a client data compute kernel 116 to the data storage service 110. The management interface may also allow clients 102 to update, modify, or remove client data compute kernels 116 that were previously uploaded.

The client kernel manager node 120 may maintain a client kernel registry 126, which keeps a record for client data compute kernels 116 that may be deployed in the data storage services 110. The client kernel registry 126 may be saved in the client kernel repository 114, as a file on the client kernel manager node 120, or in any other suitable form. The client kernel registry 126 may contain certain metadata for the clients 116. For example, each client data compute kernel 116 stored in the client kernel repository may be assigned a unique ID, such that when client data access requests directed to a particular client data compute kernel 116 is received, the particular client data compute kernel 116 may be correctly identified. The client kernel registry may also maintain one or more version tags for a client data compute kernel 116, or components within a client data compute kernel 116. A version tag may be a version number specified by the client 102, an upload or modification timestamp, or a hash value computed from the contents of the client data compute kernel 116. The version tag may be used to determine whether a deployed version of a client data compute kernel 116 is out-of-date and needs to be redeployed.

The client kernel manager node 120 may store the uploaded client data compute kernels 116 in a client kernel repository 114. The client kernel repository 114 may be part of the data repository 132 housing the other client data of the data storage service 110, or it may be a separate repository. The client kernel repository 114 may be implemented by any type of suitable data repository, such as a file system or an object database.

The client data compute kernels 116 may be uploaded in a packaged form, which need to be unpacked during a deployment. In some embodiments, when a client data compute kernel 116 is uploaded or updated, the client kernel manager 120 may perform a test deployment using the client kernel deployer 122 to determine whether the client data compute kernel 116 can be successfully deployed in the data storage service 110. If not, the client kernel manager 120 may refuse to accept or register the uploaded client data compute kernel 116 and provide an explanation to the uploading client 102. In some embodiments, the client data compute kernel 116 may also perform a set of rudimentary runtime tests on an uploaded client data compute kernel 116 when it is deployed or updated. The runtime tests may be provided in one or more test scripts specified by the client 102. The result of these runtime tests may be provided back to the client 102. The results may also be used to accept or reject the client data compute kernel from the registry 126.

The data storage service 110 may also include a request handler node 112. The request handler node 112 may include a client kernel deployer 122 and a client request router 124. The client kernel deployer 122 and client request router 124 may be software modules executing on the client request handler node 112. In some embodiments, some of these components may be implemented in the same software module. For example, the client kernel deployer 122 and client request router 124 may be implemented as a single software module. In some embodiments, these components may be operating on different nodes, or nodes other than client request handler nodes 112.

The client kernel deployer 122 may responsible for the deployment of the client data compute kernels 116a-n stored in the client kernel repository 114. As discussed, the client data compute kernels 116 may be uploaded in a packaged form, which must be unpacked during a deployment. For example, a client data compute kernel 116 may be uploaded as a package that is compressed and/or encrypted. As another example, a client data compute kernel 116 may require a metadata repository to be created and initialized in a particular data store in the data storage service 110. The client data compute kernel 116 may include a deployment script or module that can be used by the client kernel deployer 122 to deploy the client data compute kernel 116. The deployment script or module may reside in a standard location in the client data compute kernel 116 upload package, so that the client kernel deployer 122 can programmatically invoke the deployment script or module.

In some embodiments, the client kernel deployer 122 resides on the client request handler node 112. In this manner, as client data access requests a received by the client request handler node 112, the node may check if the request is associated with a particular stored client data compute kernel 116. For example, the client data access request may include a unique ID for a client data compute kernel 116 that was generated by the client kernel manager node 120 when the client data compute kernel 116 was last uploaded or modified. The client request handler node 112 may then use the client kernel deployer 122 to look up the correct client data compute kernel 116 that can be used to service the client data access request, verify that the identified client data compute kernel 116 was successfully validated by the client kernel manager node 120, and then deploy the client data compute kernel 116 to appropriate storage service nodes 130 in the data storage service 110. In this manner, the client data compute kernel 116 may be deployed to the storage services nodes 130 on an as-needed basis, as the client data access requests are received.

The client kernel deployer 122 may select which storage service nodes 130 to deploy a client data compute kernel 116. The client kernel deployer 122 may select storage service nodes 130 based on a number of factors. For example, the client kernel deployer 122 may determine that the incoming data access request is directed to a particular client data store, and that the client data store is currently associated with a group of storage service nodes 130. The client kernel deployer 122 may then deploy the client data compute kernel 116 to the group. The client kernel deployer 122 may also select a storage service nodes 130 based on other factors such as the location of the client, the current or expected load of the fleet of storage service nodes 130, or the capabilities of the storage service nodes 130. As one example, the client kernel deployer 122 may select a set of storage service nodes 130 that is in the same geographic region as the client 102 requesting data access, so as to reduce the network latency during the servicing of the data access request. Furthermore, the client kernel deployer 122 may also determine the number of storage service nodes 130 to deploy the client data compute kernel 116. As an example, for a client 102 that does not issue a large volume of data access requests, the client kernel deployer 122 may deploy the client data access request to only a single storage service node 130. Once the group of storage service nodes 130 is selected, the client kernel deployer 122 may copy the client data compute kernel 116 deployment package to the group of nodes, and cause the deployment script or module to be run on the group of nodes.

The client kernel deployer 122 may track the identities of the storage service nodes 130 to which the client data compute kernel 116 has been deployed. The client kernel deployer 122 may delete the client data compute kernel 116 from the storage service nodes 130 after servicing of the data access request is finished. Alternatively, the client data compute kernel 116 may be kept on the storage service nodes 130, possibly a subset thereof, after the servicing of the data access request, so that the client data compute kernel 116 may be used to service future data access requests. Thus, the data storage service 110 may "cache" a particular client data compute kernel 116 on particular storage service nodes 130, so that later data access requests do not require the client data compute kernel 116 to be redeployed, thereby speeding up the servicing of the request.

Occasionally, a cached client data compute kernel 116 may be updated by the client 102. In that event, the client kernel manager node 120 may notify the client kernel deployer 122 to potentially redeploy some part or all of the client data compute kernel 116 on the storage service nodes 130. The client kernel deployer 122 may compare various version tags of the client data compute kernel 116 stored in the client kernel repository 114 and the corresponding version tags of the client data compute kernel 116 deployed on the storage service nodes 130. For any component whose version in client kernel repository 114 is greater than the deployed version, the client kernel deployer 122 may redeploy those components. The client kernel deployer 122 may perform the redeployment using a deployment script or module provided with the client data compute kernel 116, which may include information on dependencies of components in the client data compute kernel 116. In one embodiment, the client kernel deployer 122 may simply redeploy the entire client data compute kernel 116.

The client kernel deployer 122 may also be responsible for the launching of deployed client data compute kernels 116 on the storage service nodes 130. The kernel deployer 122 may maintain state information that indicates where each client data compute kernel 116 is deployed and whether and how long a particular instance of client data compute kernel 116 is or has been executing on a corresponding storage service node 130.

The client request router 124 may be called in response to a client data access request received by the client request handler node 112. In some embodiments, the client request router 124 executes on the client request handler node 112. The client request router 124 may determine that the client data access request is directed to a particular client data compute kernel 116. The client request handler node 112 may call the client kernel deployer 122 to deploy and launch the client data compute kernel 116 on particular storage service nodes 130. The client request handler node 112 may then call the client request router 124 to forward the client data access request to an instance of the client data compute kernel 136. The client request router 124 may perform the forwarding using the state information maintained by the client kernel deployer 122. In some embodiments, the client data compute kernel 116 may communicate with the client 102 without further interaction from the client request router 124. In other embodiments, the client request handler node 112 may act as an intermediary between the client 102 and the storage service nodes 130.

The state information maintained by the client kernel deployer 122 may keep track of running instances of the client data compute kernels 136. In some embodiments, the client data compute kernels 116 may expose an API though which it can communicate with the client kernel deployer 122. Such API may be dictated by the data storage service 110, which may require that all client data compute kernels 116 incorporate some library functionality that allows the client data compute kernel 136 to communicate with the client kernel deployer 122. In other embodiments, the client kernel deployer 122 may not communicate with the client data compute kernel instances 136 via any special communication protocol or API. Rather, the client kernel deployer 122 may simply have the ability to launch, terminate, and/or poll the client data compute kernel instance 136 via normal facilities provided by the operating system or container manager 138 of the storage nodes 130.

The client data compute kernel instance 136 may stop executing after it services a client data access request. In other embodiments, the client data compute kernel instance 136 may continue to execute on the storage service node 130 after servicing the data access request, waiting for further data access requests. In that case, the client kernel deployer 122 may maintain a session for the client data compute kernel instance 136. A session may be started in response a client data access request. Alternatively, a session may be started proactively in response to certain events or in accordance with a particular schedule. For example, a client data compute kernel instance 136 may be started as soon a client establishes a connection to the data storage service 110. As another example, a group of client data compute kernel instances 136 may be started collectively on a number storage services nodes 130. As third example, client data compute kernel instances 136 may be started at a predetermined time on every day on a set of storage service nodes 130, in anticipation of client requests. The session may also terminate in a number of ways. For example, the client data compute kernel instance 136 may be terminated after a specified period of time during which no client requests for the client data compute kernel instance 136 are received. The client data compute kernel instance 136 may also be terminated in response to an explicit close session request from the client 102 or the client kernel deployer 122. In some cases, the client kernel deployer 122 may restart the client data compute kernel instance 136 to reset the runtime state of the client data compute kernel instance 136 or in response to a bouncing of the storage service node 130. The timing of sessions may be specified by rules provided in a policy, which may be configured by the client 102 or an administrator of the data storage service 110.

As discussed, the storage service nodes 130a-n may comprise a plurality of connected physical servers or virtual compute instances. The storage service nodes 130a-n may operate collectively to perform the functions of the data storage service 110. In some embodiments of data storage services 110, different storage service nodes 130 may perform different functions. In other embodiments, the storage service nodes 130 may perform the same function, but be assigned different slices of data, or different client data stores. In some cases, the storage service nodes 130 may represent one layer in a multilayer database that processes data access requests and relays those requests to a backend layer. For example, the storage service nodes 130 may collectively implement a query processing layer that receives, formats, and forwards data access request to a backend layer that has direct access to the underlying data repository 132.

The storage service nodes 130 may execute a storage service engine 134, which may be a software system distributed across many storage service nodes 130. The storage service engine 134 may directly interface the underlying data repository 132, or indirectly via a backend layer. In some embodiments, the backend layer may be fully fledged storage system such as a distributed block-based storage system or object database. The storage service engine 134 may implement the data access functionality of the data storage service 110. Some of the data access functionality of the storage service engine 134 may include for example query language processing, query optimization, data fetching and filtering, transaction control, and the like. Some of the data access functionality may be accessible to software components of the data storage service 110, but inaccessible via the public access interfaces of the data storage service 110. In some embodiments, by executing the client data compute kernel 116 on the storage services nodes 130 directly, the client data compute kernel 116 may gain access the data access functionality of the storage service engine 134, thus providing the client data compute kernel 116 with a richer set of tool to access the underlying data repository 132.

The storage service nodes 130 may operate a container manager 138 that supports a plurality of execution containers. One example of execution containers is for example virtualized operating system environments. Execution contains may provide an isolated environment in which applications may be run. For example, applications in one execution container may not monitor or affect applications running in a second execution environment, even if the application in the first container is executing under superuser credentials. By executing client data compute kernels 116 in execution container 138, the storage service node 130 protects its core components, such as storage service engine 134, from the any potential malicious or unintended actions of the client data compute kernel 116. In some embodiments, the storage service engine 134 may execute in it's a global execution container. The container manager 138 may be any software that can be used to launch separate execution environments, such as operating system software for launching virtualized operating system containers, machine virtualization software such as a hypervisor, a Java virtual machine launcher, or other container manager software.

The storage service node 130 may also include a client kernel cache 140 to score cached versions of client data compute kernels 136 that was previous deployed to the node 130. The client kernel cache 140 may be a simple repository that is fully controlled by the client kernel deployer 122. In some embodiments, the client kernel cache 140 may implement some cache management functionality on its own. For example, in some cases, the client kernel cache 140 may elect to remove a client data compute kernel 136 from the cache based on the current state of the storage service node 130, the remaining capacity of the cache 140, the expiration of a timer, or any variety of conditions. In such cases, the client kernel cache 140 may communicate the change in the state of the cache back to the client kernel deployer 122.

Figure 2:
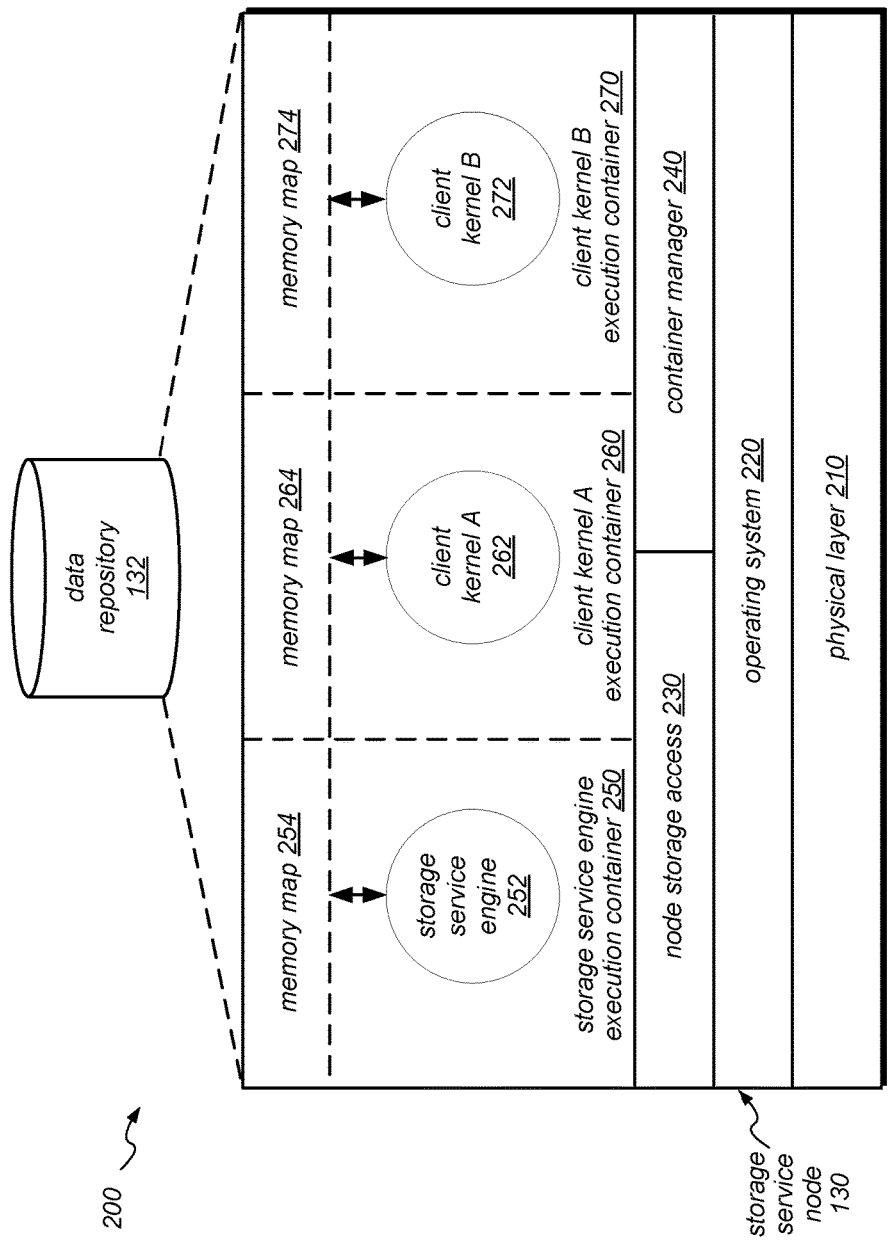
FIG. 2 is a diagram illustrating the operation of an example computer system that deploys client data compute kernels, according to some embodiments.

FIG. 2 is a diagram illustrating the operation of an example computer system that deploys client data compute kernels, according to some embodiments. The system 200 illustrates an example of a storage service node 130, discussed in connection with FIG. 1. As depicted, the storage service node 130 is a physical machine with a physical layer 210. The physical layer may comprise physical computing components such as one or more hardware processors, associated memory, input/output devices, and networking interfaces. However, as discussed, in other embodiments, the storage service node 130 may be implemented as a virtual compute instance operating on a virtualization host.

The storage service node 130 may include an operating system 220. The operating system may be a software system providing a software interface to executing applications to access the physical resources provided by the physical layer 210. The storage service node 130 may operate one or more interfaces to access storage systems attached to the storage service node, such as node storage access system 230. Node storage access system may for example expose a file system or block-based storage system stored on one or more disks, volumes, network-attached storage systems, and the like.

The storage service node 130 may employ a container manager 240 to manage a plurality of execution containers. An execution container may provide an execution environment that provides some degree of isolation from other execution environments. One example of an execution environment may be a chroot environment that is created by a chroot system call on Unix operating systems. The chroot system call changes the apparent root directory for a running program, such that the program cannot name or access files outside of the specified directory tree. The execution environment of the program may be referred to as a chroot jail. Execution containers may rely on operating system level virtualization technologies that allow for the creation of multiple isolated instances of the operation system. Examples of such containers include for example Solaris™ zones, Linux™ cgroups, FreeBSD™ jails, or a Windows™ containers. Containers may also be implemented using machine virtualization technologies, which create separate instances of virtual machine instances. Examples of such systems may include different types of hypervisors such as the Xen™ hypervisor and VMware™ hypervisors. An execution container may implement virtualized execution environments to provide an isolated environment in which applications may be run. An execution container may have a security boundary that prevents an application in one container from interacting or observing processes in other containers. Depending on the implementation, each execution container may be associated with a separate network address, and maintain a separate image of a root file system and a virtual address space based on physical memory.

FIG. 2 depicts three execution containers: storage service engine execution container 250, client kernel A execution container 260, and client kernel B execution container 270. As suggested by their names, storage service engine execution container 250 is reserved for the storage service engine 252, client kernel A execution container 260 is used to execute a client data compute kernel A 262, and client kernel B execution container 270 is used to execute a client data compute kernel B 272. The storage service engine 252 and each of the client data compute kernels 262 and 272 are isolated from each other so that they cannot generally affect the execution environments of one another.

The storage service node 130 may provide memory maps 254, 264, and 274 reflecting the contents of the data repository 132, which may be accessible from the execution containers 250, 260, and 270. The memory maps 254, 264, and 274 may be provided via the container manager 240, which may expose a memory map in each execution container 250, 260, and 270. The memory maps may be a segment of virtual memory that is assigned a byte-for-byte correlation with one or more files, devices, or similar resources that are part of the underlying data repository 132. Thus, the memory maps may enable remote direct memory access (RDMA) by the applications in the containers. In some embodiments of the data storage service 132, each storage service node 130 may be assigned to a shard of the underlying data repository 132, and the cluster of storage service nodes 130 operate in a coordinated fashion to read and write the data repository 132. The storage service engine 252 may directly read and write to the data repository 132 using a set of memory access operations on the memory maps 254, 264, or 274, which may be more efficient than accessing the underlying files or devices of the data repository 132 natively. Writes to the memory maps may zero-copy writes, in which the write operations directly update the data of data repository 132 without copying data from one memory location to another. In this manner, the client data compute kernels A and B may access the underlying storage data 132 as efficiently as the storage service engine 252.

In some embodiments, client data compute kernels may have access to runtime loadable software libraries that implement functionalities of the storage service engine 252. These libraries may be made available to client-site developers so that the client data compute kernel may be programmed to take advantage of functionalities available to the storage service engine 252. In this way, the client data compute kernels 116 may be programmed on top of these libraries, without having to duplicate the functionality implemented in the libraries. The libraries may be made available to the execution containers via the node storage access system 230 and loaded or called by the client data compute kernels at runtime. For example, client data compute kernel A may use storage service engine libraries to take advantage of features such as data fetching, data computation, logging, transaction control, query optimization, and the like. The storage service engine libraries may expose features that are not accessible via the public access interface of the data storage service 110.

Figure 3:
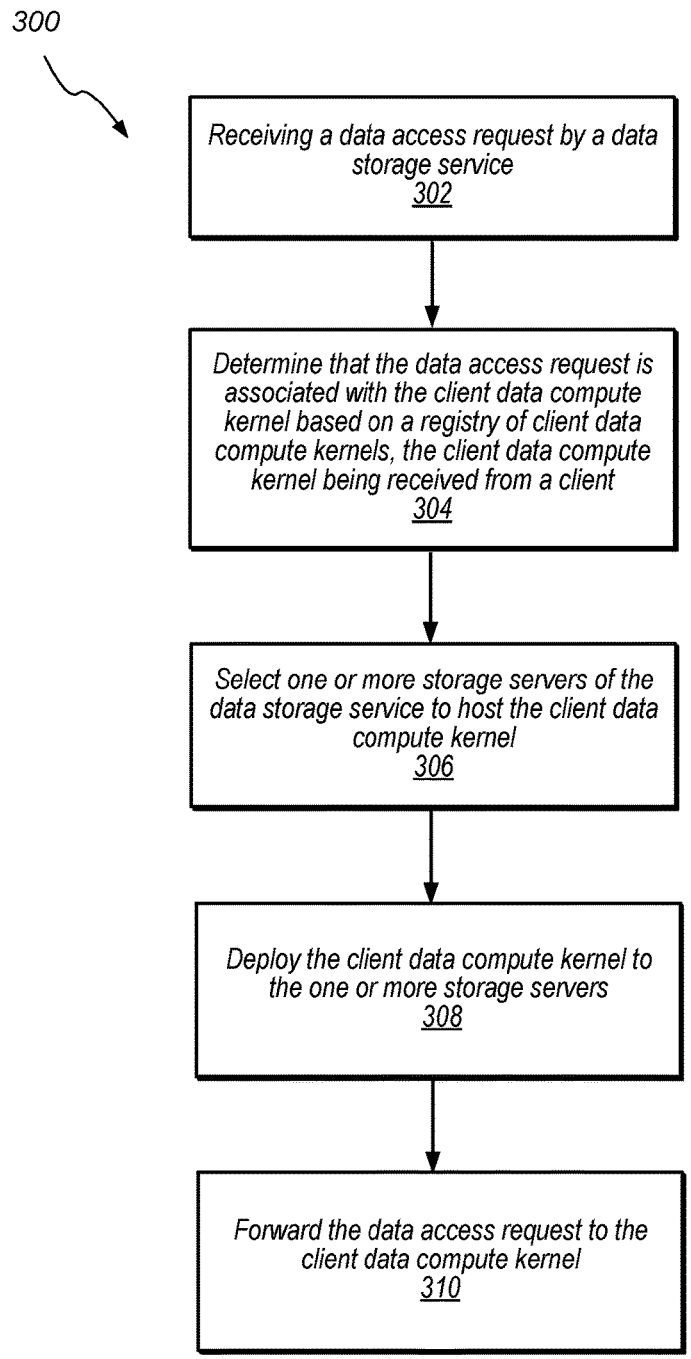
FIG. 3 is a flowchart diagram illustrating a process of handling data access request for a client data compute kernel, according to some embodiments.

Turning to FIG. 3, FIG. 3 is a flowchart diagram illustrating a process of handling data access request for a client data compute kernel, according to some embodiments. The process 300 begins at operation 302, where, a data access request is received by a data storage service. The data access request may be received by a client request handler node 112, as discussed in connection with FIG. 1. The client request handler node 112 may be a layer of nodes in the data storage service 110 that is responsible for receiving requests from clients of the data storage service 110 and forwarding the requests to data storage service nodes 130. The client request handler node 112 may be configured to handle standard request to the data storage service 110, as well as specialized requests that are directed to a client data compute kernel maintained by the data storage service 110.

At operation 304, a determination is made that the data access request is associated with the client data compute kernel based at least in part on a registry of client data compute kernels. Operation 304 may be performed by software operating on the client request handler node 112, such as the client kernel deployer 122 or the client request router 124, as discussed in connection with FIG. 1. The request handling software may check with the registry 126 to determine if the request is associated with a particular stored client data compute kernel. For example, the client data access request may include a unique identifier for a client data compute kernel that was generated by the client kernel manager node when the client data compute kernel was last uploaded or modified. The client request handler node 112 may then look up the correct client data compute kernel that can be used to service the client data access request.

At operation 306, one or more storage servers of the data storage service is selected to host the client data compute kernel. Operation 306 may be performed by software operating on the client request handler node 112, such as the client kernel deployer, as discussed in connection with FIG. 1. The client kernel deployer may select which storage service nodes to deploy a client data compute kernel based on a number of factors. For example, the client kernel deployer may select storage service nodes that are associated with the client data store being accessed. In some embodiments, the client data store may be associated with a group of storage services nodes, each node being responsible for a shard of the client data store. In some cases, the selection may be based on the known location of the client, the current load of the storage service nodes, and/or the operating capabilities of the storage service nodes.

At operation 308, the client data compute kernel is deployed to the one or more storage servers. The storage servers may be one or more storage service nodes 130, as discussed in connection with FIG. 1. Operation 308 may be performed by client kernel deployer 122, as discussed in connection with FIG. 1. The client kernel deployer 122 may copy the client data compute kernel deployment package to the selected servers, and cause a deployment script or module to be run, so as to install the client data compute kernel on the servers.

At operation 310, the data access request is forwarded to the client data compute kernel. Operation 310 may be performed by software on the client request handler node 112, for example the client request router 124. Prior to the forwarding, the client request handler node 112 may cause an instance of the client data compute kernel to launch on at least one of the storage servers. Once the client data compute kernel is up and running on the storage servers, the client request handler node may receive an acknowledgment from the storage servers. The acknowledgement may include a reference to an instance of the executing client data compute kernel, such as a network address, a port number, or a connection object. The client request handler node may then use such information to forward the data access request to the executing client data compute kernel.

Figure 4:
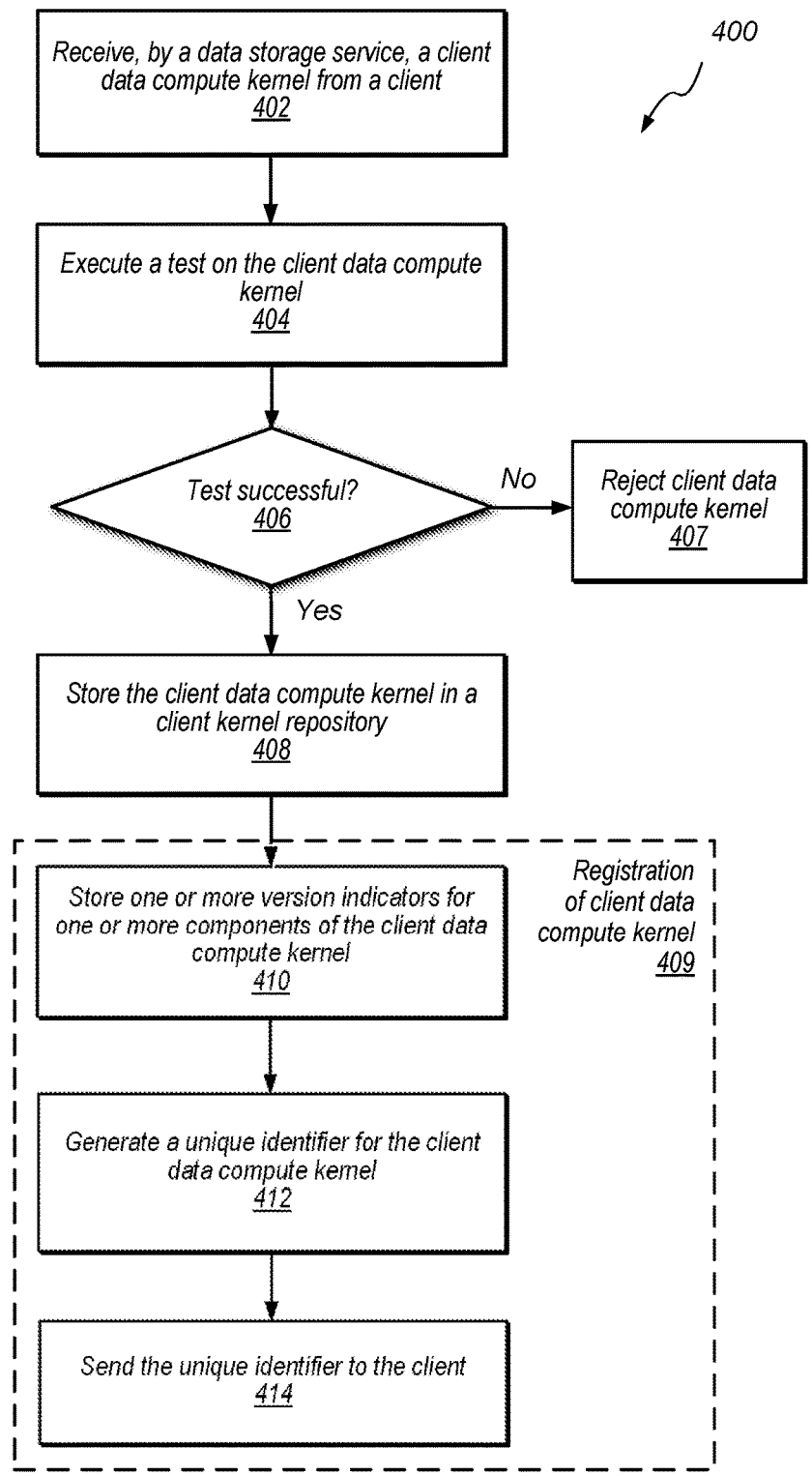
FIG. 4 is a flowchart diagram illustrating a process of registering a client data compute kernel, according to some embodiments.

Turning to FIG. 4, FIG. 4 is a flowchart diagram illustrating a process of registering a client data compute kernel, according to some embodiments. The process 400 may be carried out by the client kernel manager node 120 of the data storage service 110, as discussed in connection with FIG. 1.

The process 400 begins at operation 402, where a client data compute kernel is received by a data storage service from a client. The client data compute kernel may be an executable that is developed by client developers to be deployed in the data storage service 110. The client kernel may be specific to a client and/or received from a client.

At operation 404, a test is executed on the client data compute kernel. The test may include a deployment test which verifies that the client data compute kernel deployment package deploys properly. A deployment script or module may be associated with the client data compute kernel deployment package. The script or module may be run by the client kernel deployer 122 in a test deployment. In some embodiments, a rudimentary runtime test may be performed to ensure that the deployed client data compute kernel can launch and operate properly. In some embodiments, the client kernel manager node 120 may examine the client data compute kernel for any potential virus or malware.

At operation 406, if it is determined that the test was not successful, the client data compute kernel is rejected from the registration process. Any errors generated from the testing may be sent back to the client. The errors may also be logged by the data storage service. On the other hand, if the test was successful, the process 400 proceeds onward with the rest of the operations.

At operation 408, the client data compute kernel is stored in a client kernel repository. The client kernel repository may be the client kernel repository 114, as discussed in connection with FIG. 1. Operation 408 may be performed by the client kernel manager node 120, as discussed in connection with FIG. 1.

As illustrated, operations 410 to 414 are part of the registration process 409. Some of metadata for the client data compute kernel generated in operations 410 to 414 may be stored in the client kernel registry 126, as discussed in connection with FIG. 1. The client kernel registry may be part of the client kernel repository 114. Operations 408 to 414 may not occur in the exact order that is depicted in FIG. 4.

At operation 410, one or more version tags for one or more components of the client data compute kernel are stored. The version tags may be generated at the component level, such that each component of the client data compute kernel is assigned a version tag. The version tag may be a sequence number or a timestamp. In some cases, the version tag may be a version number provided by the client developer. In some other cases, a hash code is generated based on the contents of the component binary, such that any changes in the binary data of the component will cause a change in the hash code.

At operation 412, a unique identifier is generated for the client data compute kernel. The identifier may comprise one or more values that uniquely identifies the client data compute kernel within the client kernel repository. The unique identifier may be used as a key by the client kernel manager node 120 to maintain metadata for all client data compute kernels.

At operation 414, the unique identifier is sent to the client. The client may maintain the identifier and incorporate it in future data access requests. Data access requests that includes the unique identifier may be recognized by the client request handler node 112, which may use the identifier to look up the correct client data compute kernel that can be used to service the data access request.

Figure 5:
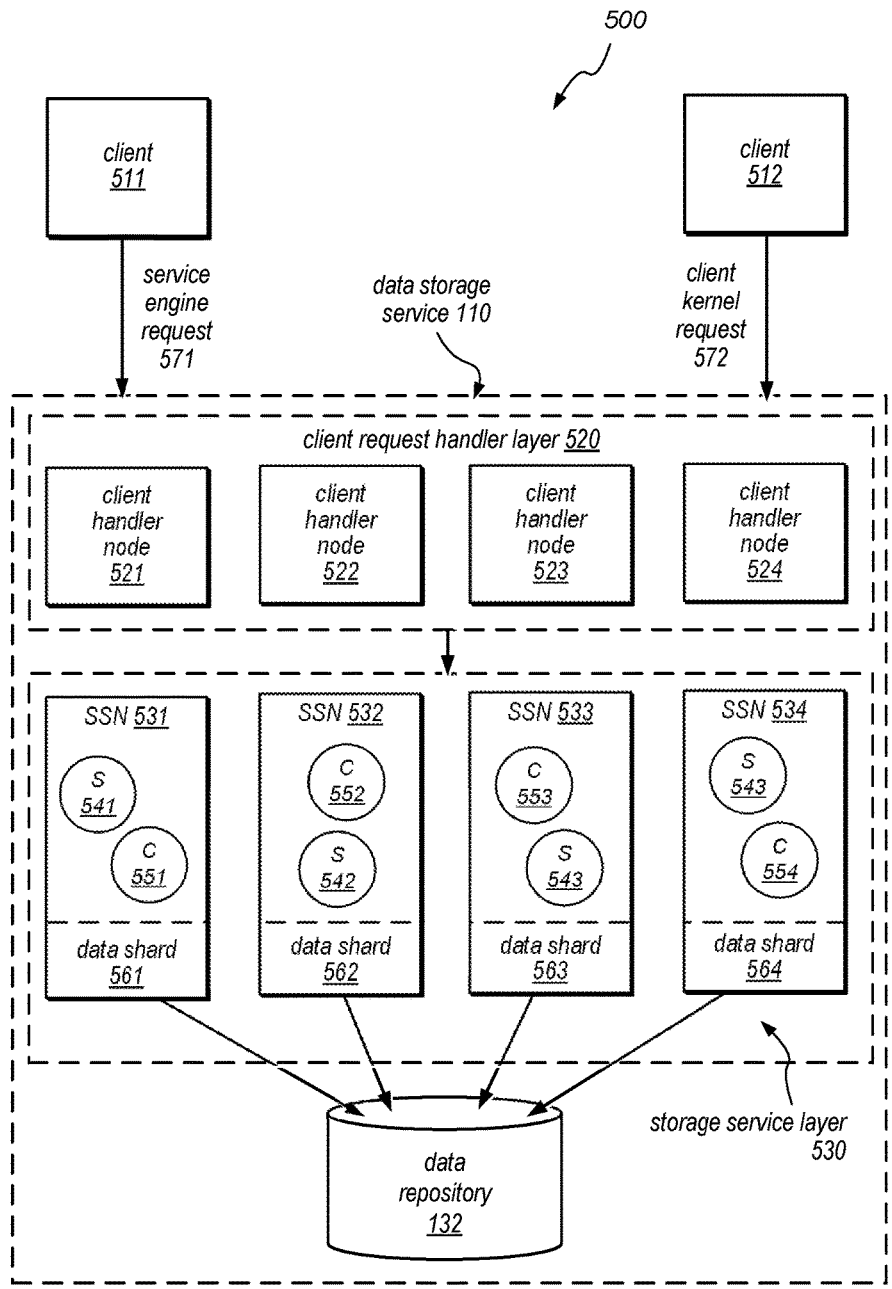
FIG. 5 is a block diagram illustrating an example computer system that supports client data compute kernels, according to some embodiments.

FIG. 5 is a block diagram illustrating an example computer system that supports client data compute kernels, according to some embodiments. FIG. 5 illustrates an exemplary implementation of a data storage service 110 that uses client data compute kernels. The depiction of FIG. 5 is presented for illustrative purposely only, and other configurations are possible.

As illustrated, the data storage service 110 includes a client request handler layer 520, which includes client handler nodes 521 to 524, and a storage service layer 530, which includes storage services nodes 531 to 534. The client request handler layer 520 may receive client data access requests and forward them to the storage service layer 530. In practice, there may not be a fixed one-to-one mapping between the client handler nodes and the storage service nodes. In some cases, responses to the client data access requests may not be relayed directly back to the clients from the storage service layer 530, but are instead relayed back to the clients via the client request handler layer 520. In some embodiments, the client data access request may cause results to be generated from multiple storage service nodes, and these results may be aggregated at the client request handler layer 520 before they are returned to the client. As discussed, the client request handler layer may implement functionality to deploy and launch client data compute engines on demand to the storage service node layer 530, in response to particular client requests. Each storage service node has access to a shard of the data repository 132 of the data storage service 110. As discussed, the data shard may be exposed to the storage service node as mapped memory, so that applications on the storage service node may access the data using direct memory operations. Each of the storage service nodes has an instance of the storage service engine executing on the node. The storage service engine is denoted by the letter S. Additionally, each of the storage service nodes has an instance of a client data compute kernel executing on the node, which is denoted by the letter C. Thus, the data storage service 110 may deploy a particular client data compute kernel to a cluster of storage service nodes that is collectively managing access to the client data store.

As illustrated, the data storage service 110 is currently servicing two clients 511 and 512. Client 511 has sent a service engine request 571 to the data storage service 110, which is being serviced by a storage service engine instances 541 to 544. Request 571 is a standard request that is defined by the standard access interface of the data storage service 110. This request may be sent in the form of a message according to a protocol defined by the data storage service 110, or an API call according to an API defined by the data storage service, or both. The service engine request 741 is serviced by storage service engines 541 to 544, each of which has access to a shard of the data repository 132.

Client 512 has sent a client kernel request 572, which is being serviced by a client data compute kernel instances 551 to 554. Thus, the client data compute kernel exposes to the client 512 a custom access interface, which may comprise a custom query language, API, or data access protocol. The custom access interface may be more convenient for the client 512, and may provide a richer set of functionality than is available via the standard interface of the data storage service 110. Moreover, by embedding the client data compute kernel 551 to 554 on the storage service nodes, the client 512 may leverage the computing power of the storage service nodes to perform its data computation and manipulation tasks. Further, the client data compute kernel 551 to 554 executes in an environment that is closer to the data repository 132 than an outside client such as client 512. Thus, the client data compute kernel 552 is able to perform the data access requests without traversing the network and do so more efficiently and more securely.

Figure 6:
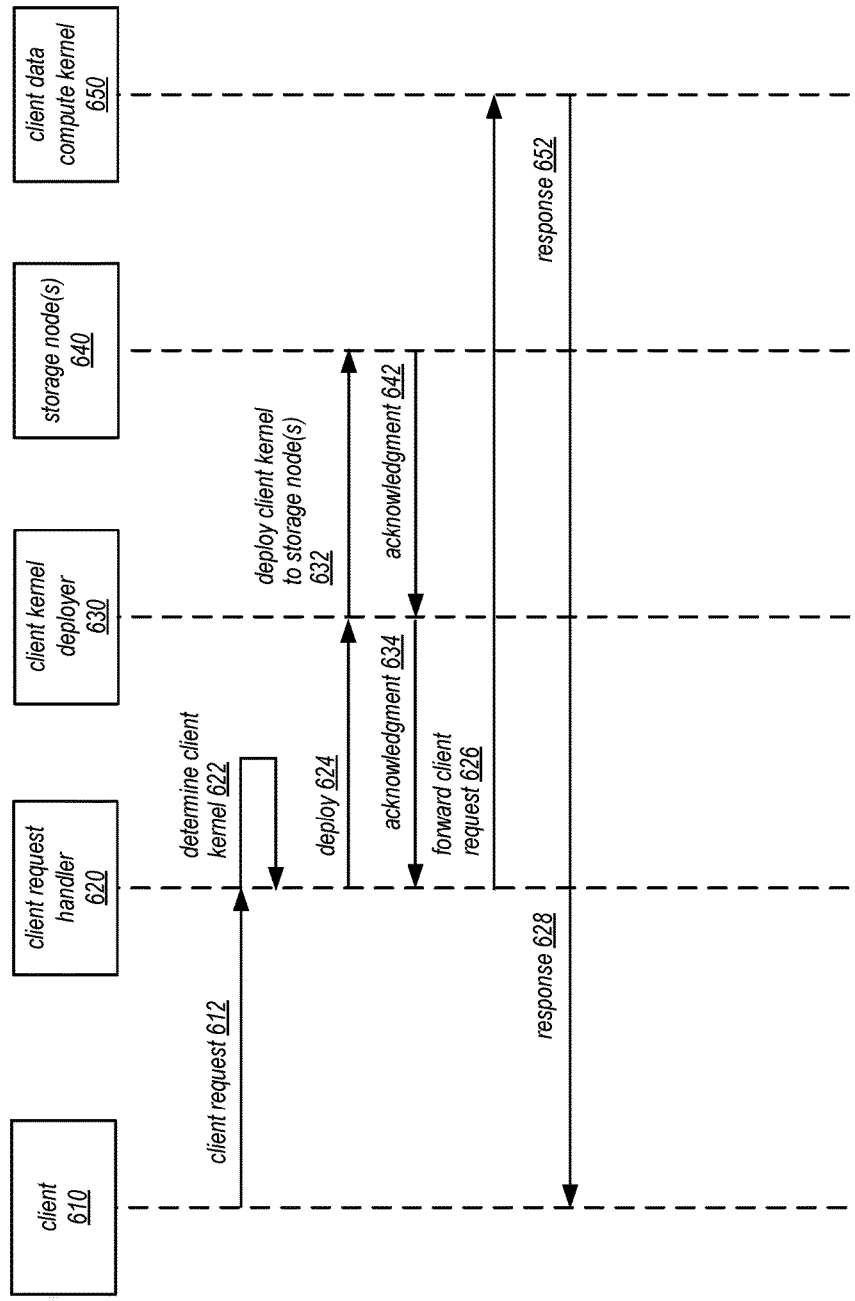
FIG. 6 is a system sequence diagram illustrating the interactions of an example computer system that deploys client data compute kernels, according to some embodiments.

FIG. 6 is a system sequence diagram illustrating the interactions of an example computer system that deploys client data compute kernels, according to some embodiments. FIG. 4 depicts the interaction among client 610, client request handler 620, client kernel deployer 630, storage node(s) 640, and client data compute kernel 650. These components may correspond the client 102, the client request handler node 112, the client kernel deployer 122, the client storage service node 130, and the client data compute kernel instance 136, as discussed in connection with FIG. 1.

The interactions of FIG. 6 depict a process wherein a client data compute kernel is deployed in response to a client data access request. At interaction 612, the client 610 sends a client request to client request handler 620. The client request may be transmitted over the network 104 as discussed in connection with FIG. 1.

At interaction 622, the client request handler 620 determines a client data compute kernel for the client request. This determination may be made by a lookup operation to look up a client data compute kernel stored in the client kernel registry 126 or the client kernel repository 114, based on a unique ID contained in the client request. Once the appropriate client data compute kernel is identified, the client request handler 620 may call on the client kernel deployer 630 in interaction 624 to deploy the client data compute kernel. As discussed in connection with FIG. 1, the client kernel deployer 630 may operate on the same node as the client request handler 620.

At interaction 632, the client kernel deployer 630 deploys the client data compute kernel to one or more storage nodes 640. During this interaction, the client kernel deployer 630 may deploy the client data compute kernel to a cluster of storage service nodes that are responsible for maintaining access to the client data store. In some embodiments, the storage service nodes may be selected based on factors such as the location of the client, the current load of the storage nodes and the operating capacities of the storage nodes. Once a set of storage nodes 640 is selected, the client kernel deployer may transmit the client data compute kernel deployment package to the storage nodes 640, and cause a deployment script or module associated with the deployment package to be run on the storage nodes.

At interaction 642, an acknowledgment is transmitted by one or more storage nodes 640 to the client kernel deployer 630. The deployment process on the storage nodes may be monitored by the client kernel deployer 630. For example, the client kernel deployer 630 may communicate with agent processes running on the storage nodes 640 to monitor the deployment process. As another example, a deployment module on the storage node 640 may return a result message to the client kernel deployer 630 using a message protocol. In this way, the storage nodes 640 may transmit an acknowledgment 642 back to the client kernel deployer 630. In some embodiments, an explicit acknowledgment may not be necessary. For example, the client kernel deployer 630 may simply examine the contents of a log file that is generated as a result of the deployment process, and determine whether or not a particular deployment was successful based on the log file. In the event that deployment fails at one storage node 640, the client kernel deployer 630 may select another storage node to deploy the client data compute kernel.

At interaction 634, the client kernel deployer 630 transmits an acknowledgment back to the client request handler 620. Acknowledgment 634 may indicate that the client data compute kernel has been successfully deployed on the storage nodes 640, or at least a sufficient quorum of storage nodes 640. As discussed in connection with FIG. 1, the deployment may involve launching the client data compute kernel on the one or more storage nodes 640. Accordingly, in some embodiments, the acknowledgment 634 may further indicate that the client data compute kernel is up and running on the storage nodes 640. In this case, the acknowledgment 634 may include a reference to one or more running instances of the client data compute kernel, by specifying for example a network address or a connection object to the running instances.

At interaction 626, the client request handler 620 forwards the client request 626 to a running instance of the client data compute kernel 650. The forwarding may be performed by the client request router 124 of FIG. 1. In some embodiments, the client request router 124 may forward the client request by using a reference to the client data compute kernel that was provided in the acknowledgment 634. Alternatively, client request handler 620 may simply broadcast the client request via a cluster protocol, and the request may be serviced by storage node that is capable of handling the request.

At interaction 652, the client data compute kernel 650 that receives the request may transmit a response back to the client request handler 620. In some embodiments, the client request handler 620 may receive responses back from multiple instances of client data compute kernels on multiple storage nodes 640, which may be operating over different shards of the client data store. The client request handler 620 may aggregate these responses before they are transmitted back to the client 610 at interaction 628.

Figure 7:
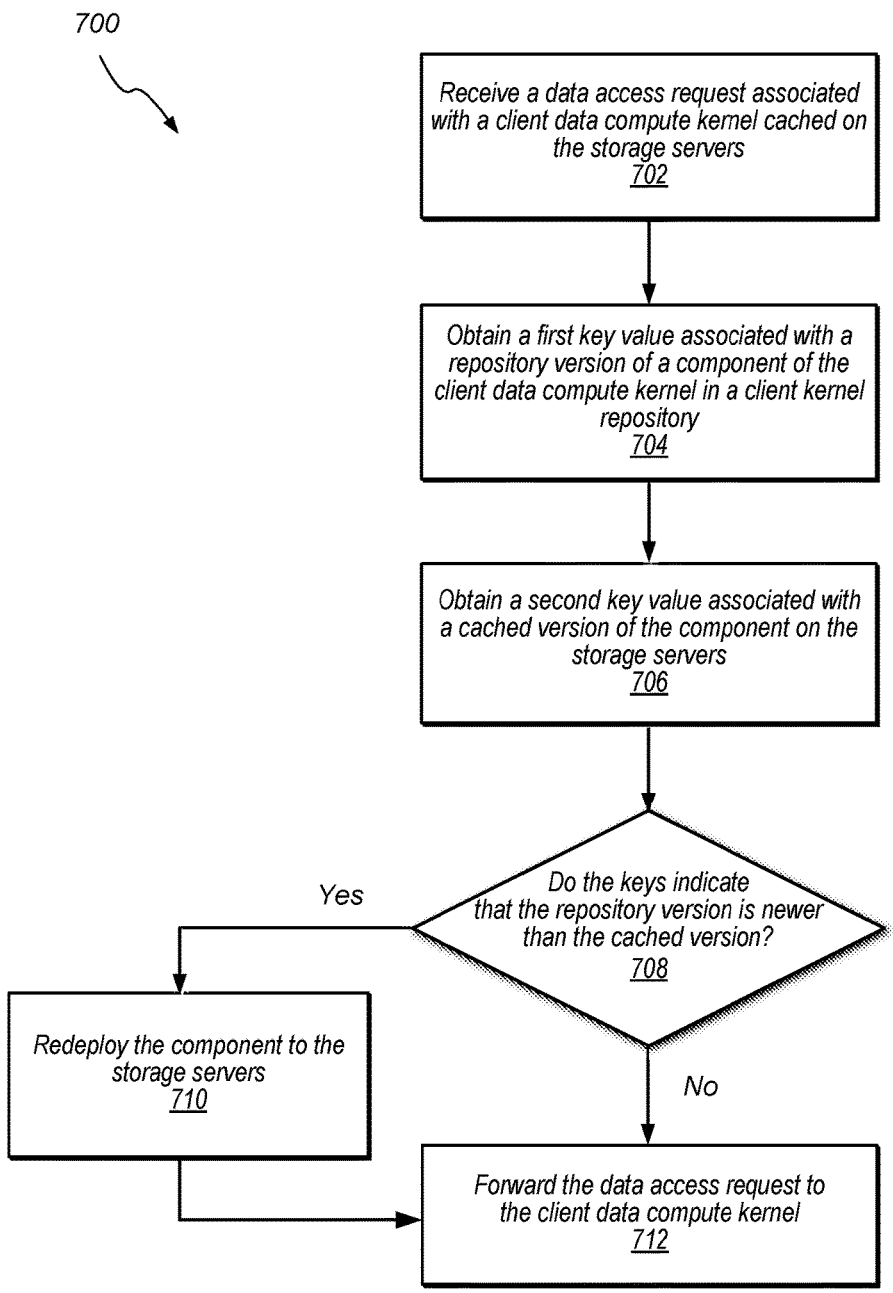
FIG. 7 is a flowchart diagram illustrating a process of redeploying a client data compute kernel, according to some embodiments.

FIG. 7 is a flowchart diagram illustrating a process of redeploying a client data compute kernel, according to some embodiments. The process 700 begins at operation 702, where a data access request associated with a client data compute kernel cached on a storage server is received. The storage server may be a storage service node 130, as discussed in connection with FIG. 1. Operation 702 may be performed by the client request handler node 112 of FIG. 1. As discussed, the storage service node 130 may implement a client kernel cache 140, which may maintain a caching scheme that caches the client data compute kernel on one or more storage service nodes 130 to service multiple client data access requests.

On occasion, the data storage service 110 may receive an updated version of a client data compute kernel via the client kernel manager node 120. The client kernel manager node 120 may store the updated version in the client kernel repository 114 and update the client kernel registry 126. For incoming client data compute kernels, the client kernel manager node may validate the updated client data compute kernel, and generate a unique identifier and version tag for the updated client data compute kernel. The version indicator may be generated at the component level, such that each component of the updated client data compute kernel may be assigned a version tag. The version tag may be a sequence number or a timestamp. In some cases, the version tag may be a version number provided by the client developer. In some other cases, a hash code generated based on the contents of the component binary, such that any changes in the binary data of the component will cause a change in the hash code.

When an updated version of a client data compute kernel is uploaded, the client kernel manager node 120 may not be aware that an older version of the client data compute kernel is currently deployed on the storage service nodes 130. Thus, the next operations in process 700 describes a check that ensures that a cached version of a client data compute kernel is the latest version of the client data compute kernel. Of course, in some embodiments, the client kernel manager node 120 may simply automatically redeploy the client data compute kernel on all of the storage services nodes 130 upon receiving the client request, thus ensuring the cached version of the client data compute kernel will always be up-to-date.

At operation 704, a first key value associated a repository version of a component of the client data compute kernel in a client kernel repository is obtained. At operation 706, a second key value associated with a cached version of the component on the storage servers is obtained. At operation 708, a determination is made whether the keys indicate that the repository version of the component is newer than the cached version of the component.

Operations 704, 706, and 708 may be performed by the client kernel deployer 122, which may be queried by the client request handler node 112 to verify whether the client data compute kernel in question is currently deployed. During this process, the client kernel deployer 122 may compare the component version tags in the client kernel repository 114 against the version tags of the client data compute kernel that is deployed on the storage service nodes 130. In some embodiments, the first key may be a hash code computed from the binary data of the component. Thus, if the hash code for the repository version of the component is different from the hash code for the deployed version of the component, that difference indicates that the repository version is newer and must be redeployed to the storage service nodes 130. On the other hand, if the two hash codes are the same, then redeployment of the component may not be necessary. In some other embodiments, the version tag may simply be a sequence number or a timestamp. In that case, any new component will cause a redeployment to occur. It should be noted that in some embodiments, the dependencies of components in a client data compute kernel are specified in the deployment package of the client data compute kernel. Thus, the client kernel deployer 122 may simply rely on a deployment package script or module to determine which components should be redeployed.

If the keys indicate that the repository version of the component is newer, at operation 710, the component is redeployed to the storage servers. Operation 710 may be performed by the client kernel deployer 122. The redeployment may be less than a full deployment of the client data compute kernel. For example, in some cases, only the components that need to be redeployed are copied to the storage services nodes 130. A deployment script or module may then be run to reproduce the binary for the executable client data compute kernel. If the client data compute kernel is currently executing on the storage nodes 130, it may be terminated and restarted after the redeployment.

Otherwise, if the keys indicate that the repository version of the component is not newer than the cached version, then operation 710 is bypassed. The process 700 may then proceed directly to operation 712, in which the data access request is forwarded to the client data compute kernel on the storage services nodes 130. Operation 712 may be performed in a similar fashion as operation 310 in FIG. 3.

Figure 8A:
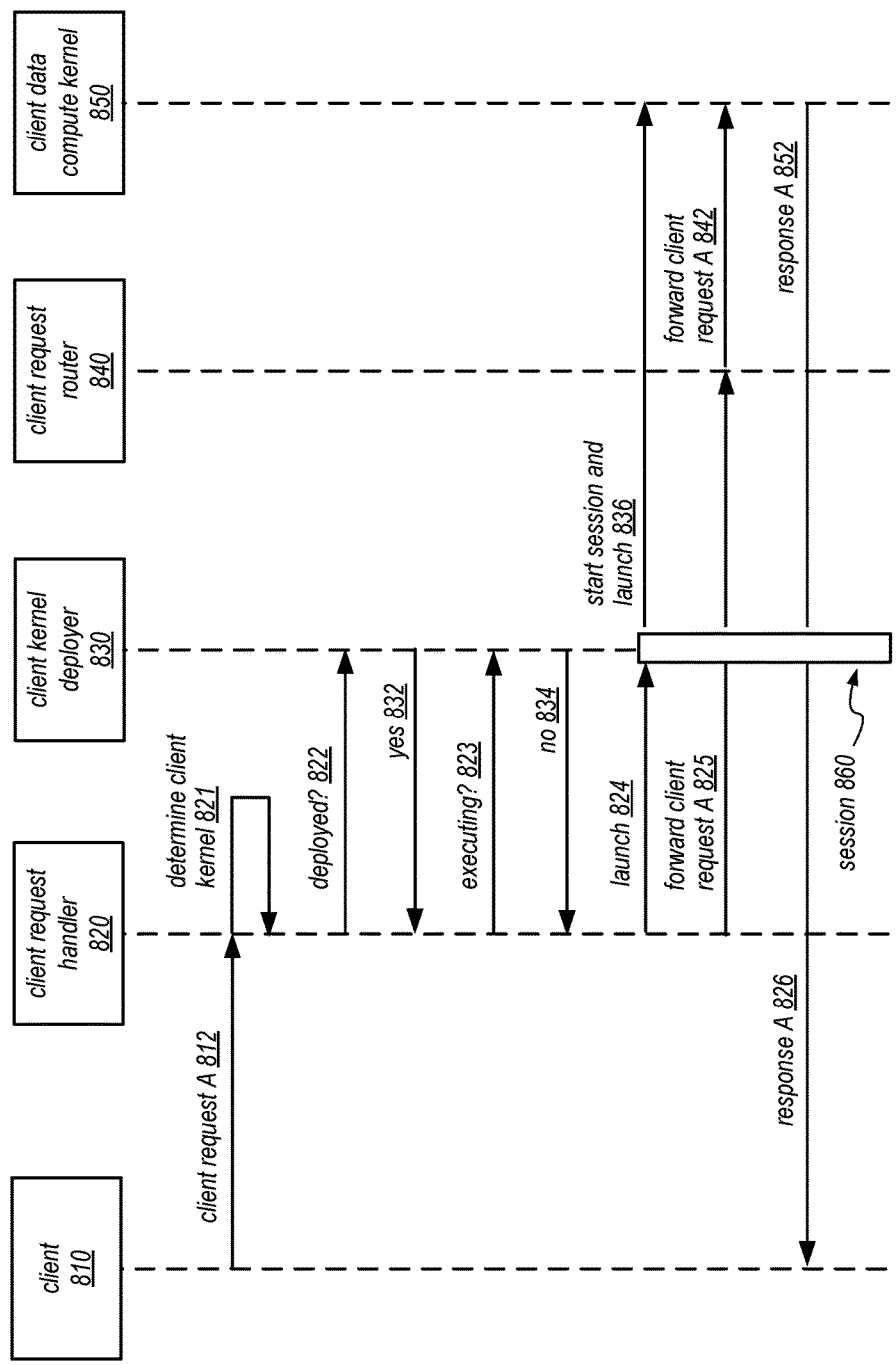
FIGS. 8A and 8B comprise a system sequence diagram illustrating the interactions of an example computer system that deploys and executes client data compute kernels, according to some embodiments.
Figure 8B:
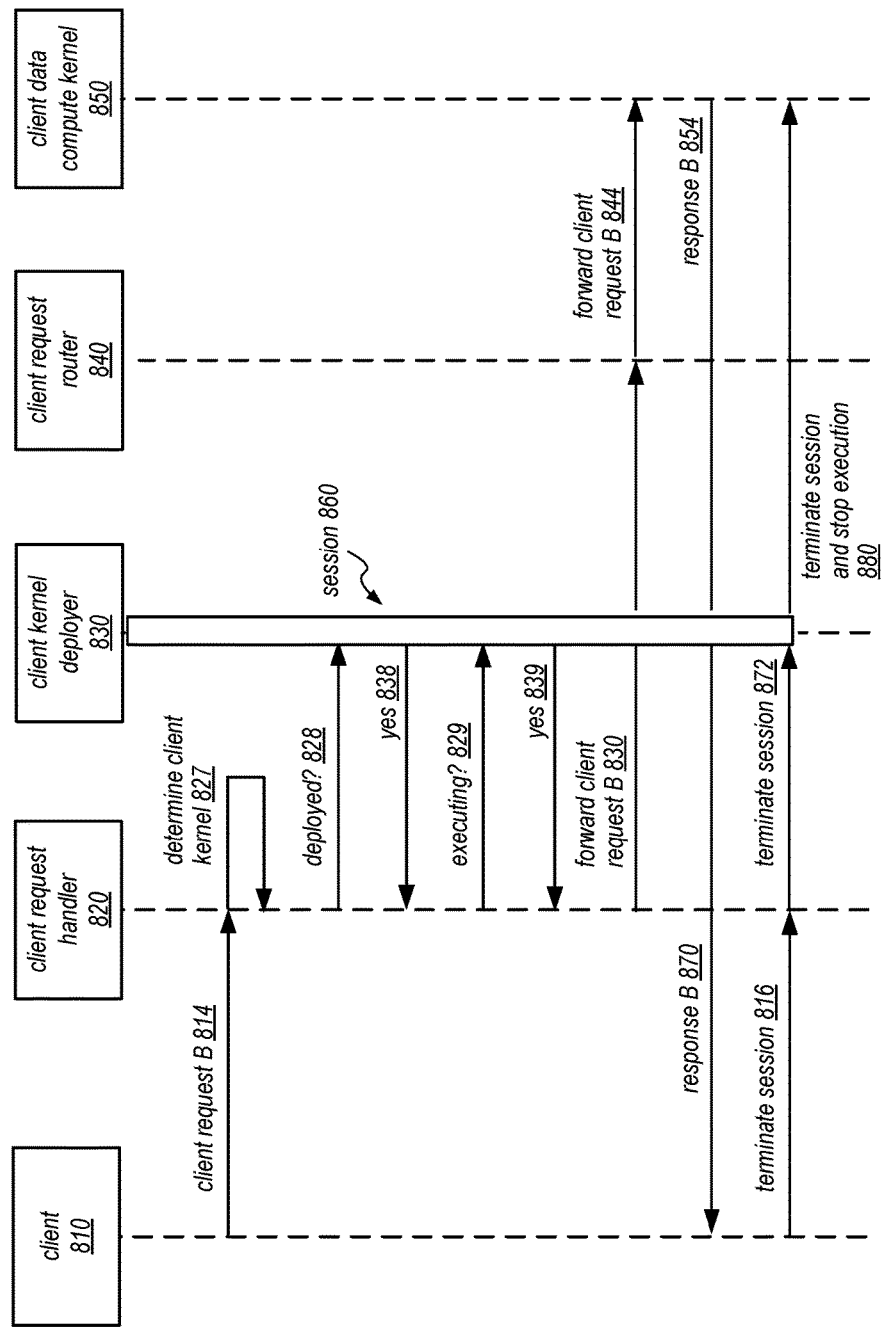

Turning to FIGS. 8A and 8B, FIGS. 8A and 8B comprise a system sequence diagram illustrating the interactions of an example computer system that deploys and executes client data compute kernels, according to some embodiments.

FIGS. 8A and 8B depict the interaction among client 810, client request handler 820, client kernel deployer 830, client request router 840, and client data compute kernel 850. These components may correspond the client 102, the client request handler node 112, the client kernel deployer 122, the client request router 124, and the client data compute kernel instance 136, as discussed in connection with FIG. 1.

The interactions of FIGS. 8A and 8B depict a process wherein a client data compute kernel instance 850 is launched for a first client request and then continues to execute to service a second client request. At interaction 812, the client 810 sends a client request A to client request handler 820. At interaction 821, the client request handler 820 determines a client data compute kernel that is associated with the client request A.

At interaction 822, the client request handler 820 queries the client kernel deployer 830 to check whether the identified client data compute kernel is currently deployed on the storage nodes. At interaction 832, the client kernel deployer 830 responds yes, indicating that the client data compute kernel is cached on the storage nodes.

At interaction 823, the client request handler 820 queries the client kernel deployer 830 to check whether the client data compute kernel is currently executing on the storage nodes. As discussed in connection with FIG. 1, the client kernel deployer 830 may track the execution status of instances of the client data compute kernel 850. In some embodiments, the client kernel deployer 830 may maintain state information concerning the execution status of various client data compute kernels. The client kernel deployer 830 may expose a query interface to allow the client request handler 820 to check whether a client data compute kernel is currently running. Alternatively, the client kernel deployer 830 may hide the execution status information from the client request handler 820, and simply manage the execution of client data compute kernels on its own.

At interaction 834, the client kernel deployer 830 indicates to the client request handler 820 that the client data compute kernel is not currently executing. As a result, at interaction 824, the client request handler 820 instructs the client kernel deployer 830 to launch the client data compute kernel on the storage nodes.

At interaction 846, the client kernel deployer starts a session for the client data compute kernel and launches the client data compute kernel 850. Interaction 836 may be performed using agents of the client kernel deployer 830 operating on the storage nodes, which may also be used to monitor the running client data compute kernels. Alternatively, the client kernel deployer 830 may simply issue a call to the operating system or container manager of the storage nodes to invoke the client data compute kernel, and monitor the client data compute kernel via functionality provided by the operating system or container manager. The session 860 is maintained by the client kernel deployer 830 and may remain open as long as the client data compute kernel 850 is executing.

At interaction 825, the client request handler 820 forwards the client request A to the client request router 840. At interaction 842, the client request router forwards the client request A to the client data compute kernel 850. In some embodiments, the client kernel deployer 830 may provide to the client request handler 720 a reference to the running instance of the client data compute kernel 850, such as a network address or a connection object, so that the client request hander 820 can directly forward the request to the client data compute kernel 850. In other embodiments, the client request handler 820 may use the client request router 840 to forward the request. The client request router 840 may implement a variety of ways of forwarding the request. In some embodiments, the client request router 840 may broadcast the request to a group of storage nodes, or place the request on a common request queue, and storage nodes that are capable of handling the special client request will be assigned to or handle the request.

At interaction 852, the client data compute kernel 850 finishes servicing client request A and provides back to the client request handler 820 a response A. In some embodiments, the client request handler 820 may receive responses from multiple instances of client data compute kernels executing on multiple storage service nodes. The client request handler 820 may aggregate all the responses and then relay the response back to the client 810 at interaction 826.

At interaction 814, which appears on FIG. 7B, the client 810 transmits a second client request B to the client request handler 820. At interaction 827, the client request handler 820 determines the client data compute kernel 850 is associated with the client request B. Interactions 814 and 827 may be performed in similar fashion to interactions 812 and 821, respectively.

At interaction 828, the client request handler 820 queries the client kernel deployer 830 to check whether the identified client data compute kernel is currently deployed on the storage nodes. At interaction 838, the client kernel deployer 830 responds yes, indicating that the client data compute kernel is cached on the storage nodes. Interactions 827 and 838 may be performed in a similar fashion as interactions 822 and 832, respectively.

At interaction 829, the client request handler 820 queries the client kernel deployer 830 to check whether the client data compute kernel is currently executing on the storage nodes. This time, unlike with interaction 823, the client kernel deployer 830 may determine from its state information that an instance of the client data compute kernel 850 is currently executing on the storage nodes. In particular, the client kernel deployer 830 may recognize that there is an open session associated with the client data compute kernel 850.

In response, at interaction 839, the client kernel deployer 830 indicates to the client request handler 820 that the client data compute kernel is currently executing. As a result, the client request handler 820 does not issue another request to launch the client data compute kernel. By skipping the launching step, the servicing of client request B may be performed more quickly. The use of a session is thus particularly useful in cases where client requests for a particular client data compute kernel are received in bursts. In such cases, the client kernel deployer 830 may keep the client data compute kernel instance running for short periods of time for quick servicing of the bursts, and terminate the client data compute kernel instance after a burst, freeing up the storage node for other tasks. In some cases, it may be necessary to maintain some client state across multiple client requests. For example, the client 810 may wish to count the number of requests handled during an open session. The session maintained by the client kernel deployer 830 may be accessed by the client 810 for such purposes.

At interaction 830, the client request handler forwards client request B to the client request router 840. At interaction 844, the client request router 840 forwards the client request B to the client data compute kernel 750. At interaction 854, the client data compute kernel returns a response B back to the client request handler 820, which may aggregate the response and transmit it back to the client 810 at interaction 870. Interactions 830, 844, 854, and 870 may be performed in similar fashion to interactions 825, 842, 852, and 826 respectively.

At interaction 816, client 810 transmits a terminate session request to the client request handler. In some embodiments, the client 810 may be aware of the session 860 for a client data compute kernel 850, and may control the session via explicit calls. In other embodiments, the details of the session 860 may be hidden from the client 810, and the opening and closing of the session 860 may be managed by the data storage service.

At interaction 872, the client request handler 820 forwards the terminate session request to the client kernel deployer 830. In response, at interaction 880, the client kernel deployer updates its state information to terminate the session 860 and stops the client data compute kernel instance 850 from executing on the storage nodes. The client kernel deployer 830 may stop the execution of the client data compute kernel 850 by using an agent operating on the storage node, or via a call to the operating system of the storage node.

Figure 9:
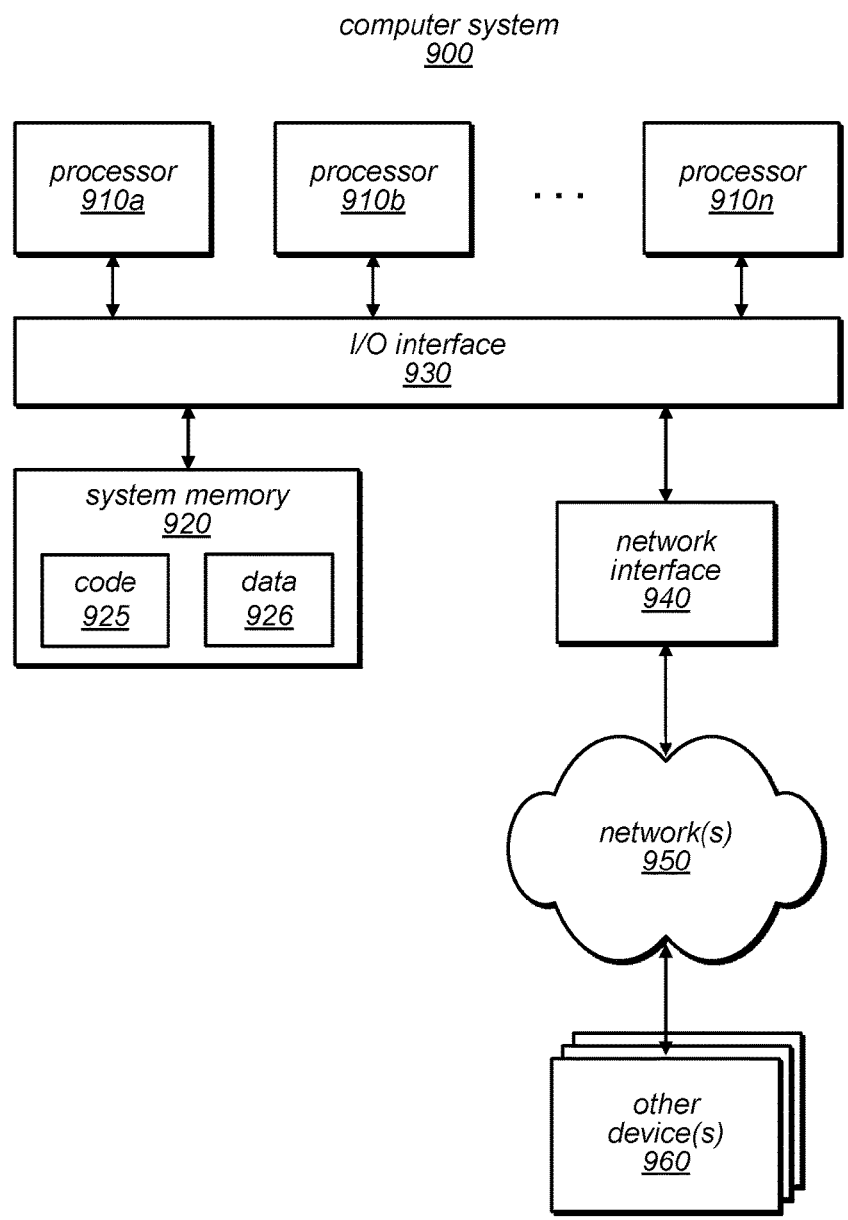
FIG. 9 is a block diagram illustrating an example computer system that can be used to implement a client data compute kernel deployment system, according to some embodiments.

FIG. 9 is a block diagram illustrating an example computer system that can be used to implement a client data compute kernel deployment system, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
one or more nodes that implement a data storage service, each node of the one or more nodes comprising one or more hardware processors and memory;
a client kernel manager node of the one or more nodes, configured to:
receive a client data compute kernel executable to access a client data store maintained by a data storage service, the client data compute kernel received from a client;
store the client data compute kernel in a client kernel repository; and
register in a registry that the client data compute kernel is associated with a type of data access request;
a client request handler node of the one or more nodes, configured to, in response to receiving a data access request to access the client data store;
select a storage service node of the data storage service to service the request;
determine based at least part on the registry that the data access request is associated with the client data compute kernel;
deploy the client data compute kernel on the storage service node; and
forward the data access request to the client data compute kernel.

2. The system of claim 1, wherein the storage service node is configured to:
execute a storage service engine of the data storage service in a first execution container;
receive the data access request; and
execute the client data compute kernel to service the data access request in a second execution container.

3. The system of claim 2, wherein the storage service node is configured maintain a shared memory of at least a portion of the contents of the client data store, and the shared memory is directly accessible to the first and second execution containers.

4. The system of claim 2, wherein the client request handler node is configured to:
deploy the client data compute kernel on a plurality of storage service nodes, each storage service node of the plurality of storage service nodes associated with a shard of the client data store;
forward the data access request to instances of the client data compute kernel on the plurality of the storage service nodes;
receive a plurality of results for the data access request from the plurality of the storage service nodes; and
aggregate the plurality of results to create a response to the data access request.

5. The system of claim 1, wherein the storage service node comprises a virtual machine instance operating on a virtual machine host.

6. The system of claim 1, wherein:
the storage service node comprises a client data compute kernel cache configured to cache client data compute kernels deployed to the storage service node; and
the client request handler node is configured to:
determine whether the client data compute kernel is cached on the storage service node; and
deploy the client data compute kernel on the storage service node in response to the determination that the client data compute kernel is not cached on the storage service node.

7. A method, comprising:
performing, by a data storage service, in response to receiving a data access request to access a client data store;
determining that the data access request is associated with the client data compute kernel based at least in part on a registry of client data compute kernels, the client data compute kernel being received from a client;
deploying the client data compute kernel to one or more storage servers of the data storage service; and
executing the client data compute kernel on the one or more storage servers to service the data access request.

8. The method of claim 7, further comprising:
prior to receiving the data access request:
receiving, by the data storage service, the client data compute kernel from the client;
storing the client data compute kernel in a client kernel repository; and
registering the client data compute kernel in a registry of client data compute kernels.

9. The method of claim 7, further comprising:
caching at the client data compute kernel on the one or more storage servers after the client data compute kernel finishes servicing the data access request;
receiving a second data access request for the data storage service associated with the client data compute kernel;
obtaining a first key value associated with a repository version of a component of the client data compute kernel in the client kernel repository;
obtaining a second key value associated with a cached version of the component on the one or more storage servers;
determining that the first and second keys indicate that the repository version of the component is newer than the cached version of the component; and
in response to the determination that the repository version is newer than the cached version, redeploying the component to the one or more storage servers.

10. The method of claim 7, wherein:
deploying the client data compute kernel comprises deploying the client data compute kernel to a plurality of storage servers including the one or more storage servers, each storage server of the plurality of storage servers associated with a shard of the client data store; and
executing the client data compute kernel comprises executing the client data compute kernel on the plurality of storage servers to service the data access request.

11. The method of claim 8, wherein registering the client data compute kernel in a registry comprises:
generating a unique identifier for the client data access request; and
sending the unique identifier to the client.

12. The method of claim 8, wherein registering the client data compute kernel in a registry comprises:
storing in the registry one or more version tags corresponding one or more components of the client data compute kernel.

13. The method of claim 8, further comprising:
receiving, by the data storage service, a second client data compute kernel from the client;
executing a test on the second client data compute kernel; and
accepting or rejecting the second client data compute kernel for registration based on results of the test.

14. The method of claim 7, further comprising:
initiating a session and launching the client data compute kernel to service the data access request; and
continuing to execute the client data compute kernel during the session to service additional data access requests.

15. The method of claim 10, further comprising:
receiving a plurality of results for the data access request from the plurality of storage servers; and
aggregating the plurality of results to generate a response to the data access request.

16. The method of claim 7, wherein executing the client data compute kernel comprises making a call from the client data compute kernel to a data storage service library stored on the one or more data storage servers via an application programming interface (API) exposed by the data storage service library.

17. The method of claim 15, further comprising:
operating a plurality of execution containers on the one or more storage servers; and
wherein executing the storage service engine comprises executing the storage service engine in a first execution container of the plurality of execution containers; and
wherein executing the client data compute kernel comprises selecting a second execution container from the plurality of execution containers in which to execute the client data compute kernel.

18. A non-transitory computer-accessible storage medium storing program instructions that when executed on one or more processors cause the one or more processors to:
perform, by a data storage service, in response to receiving a data access request to access a client data store:
determine that the data access request is associated with the client data compute kernel received from a client, the client data compute kernel executable to access a client data store maintained by the data storage service;
select one or more storage servers hosting the data storage service to host;
deploy the client data compute kernel to the one or more storage servers; and
forward the data access request to the client data compute kernel.

19. The non-transitory computer-accessible storage medium of claim 18, wherein the program instructions when executed on one or more processors cause the one or more processors to:
prior to receiving the data access request:
receive the client data compute kernel from the client;
execute a test on the client data compute kernel; and
based at least in part on results of the test, register the client data compute kernel in a registry of client data compute kernels.

20. The non-transitory computer-accessible storage medium of claim 19, wherein the program instructions when executed on one or more processors cause the one or more processors to:
store in the registry one or more version tags corresponding one or more components of the client data compute kernel.

* * * * *